(12) United States Patent
Jun et al.

(10) Patent No.: US 10,362,315 B2
(45) Date of Patent: Jul. 23, 2019

(54) CODEC AND DEVICES INCLUDING THE SAME

(71) Applicant: Samsung Electronics Co., Ltd., Gyeonggi-do (KR)

(72) Inventors: Sung Ho Jun, Gyeonggi-do (KR); Nyeong Kyu Kwon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 522 days.

(21) Appl. No.: 14/830,188

(22) Filed: Aug. 19, 2015

(65) Prior Publication Data

US 2016/0080746 A1    Mar. 17, 2016

(30) Foreign Application Priority Data

Sep. 17, 2014 (KR) .................. 10-2014-0123801

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/167* | (2014.01) |
| *H04N 19/124* | (2014.01) |
| *H04N 19/14* | (2014.01) |
| *H04N 19/172* | (2014.01) |
| *H04N 19/142* | (2014.01) |
| *H04N 19/17* | (2014.01) |
| *H04N 19/20* | (2014.01) |

(52) U.S. Cl.
CPC ......... *H04N 19/167* (2014.11); *H04N 19/124* (2014.11); *H04N 19/14* (2014.11); *H04N 19/142* (2014.11); *H04N 19/172* (2014.11); *H04N 19/17* (2014.11); *H04N 19/20* (2014.11)

(58) Field of Classification Search
CPC .......................... H04N 19/124; H04N 19/167
See application file for complete search history.

(56) References Cited

U.S. PATENT DOCUMENTS

| | | | | |
|---|---|---|---|---|
| 7,593,462 | B2 * | 9/2009 | Shimada | H04N 19/176 375/240 |
| 2006/0140267 | A1 * | 6/2006 | He | H04N 19/159 375/240.03 |
| 2006/0204113 | A1 * | 9/2006 | Wang | H04N 19/147 382/236 |
| 2006/0215753 | A1 * | 9/2006 | Lee | H04N 7/147 375/240.08 |

(Continued)

FOREIGN PATENT DOCUMENTS

| | | |
|---|---|---|
| JP | 2010187337 | 8/2010 |
| KR | 1020070114798 | 12/2007 |

(Continued)

*Primary Examiner* — Tat C Chio
*Assistant Examiner* — Fabio S Lima
(74) *Attorney, Agent, or Firm* — The Farrell Law Firm, P.C.

(57) ABSTRACT

A method, codec device, and system on chip (SoC) are provided for coding a region of interest (ROI) object of a frame. A current frame, which includes the ROI object is received, and a type of the current frame is determined. A complexity of the current frame is estimated. An ROI control signal is generated for controlling ROI coding of the ROI object based on the complexity.

17 Claims, 13 Drawing Sheets

(56) References Cited

U.S. PATENT DOCUMENTS

| | | | | |
|---|---|---|---|---|
| 2006/0215766 | A1* | 9/2006 | Wang | H04N 19/147 375/240.24 |
| 2006/0238444 | A1* | 10/2006 | Wang | H04N 19/147 345/55 |
| 2007/0076947 | A1* | 4/2007 | Wang | G06K 9/00234 382/165 |
| 2007/0076957 | A1* | 4/2007 | Wang | G06K 9/00234 382/195 |
| 2007/0189623 | A1* | 8/2007 | Ryu | H04N 19/117 382/243 |
| 2008/0151998 | A1* | 6/2008 | He | H04N 19/147 375/240.03 |
| 2011/0235706 | A1* | 9/2011 | Demircin | H04N 19/126 375/240.03 |
| 2012/0269258 | A1* | 10/2012 | Yang | H04N 19/172 375/240.02 |
| 2013/0077871 | A1 | 3/2013 | Lu et al. | |
| 2013/0322524 | A1* | 12/2013 | Jang | H04N 19/30 375/240.03 |

FOREIGN PATENT DOCUMENTS

| | | |
|---|---|---|
| KR | 1020120059214 | 6/2012 |
| KR | 1020130093675 | 8/2013 |

\* cited by examiner

ROI-I (ROI_ON)

| 0 | 0 | 0 | 2 | 2 |
|---|---|---|---|---|
| 0 | 1 | 1 | 1 | 2 |
| 2 | 1 | 1 | 1 | 2 |
| 0 | 1 | 1 | 1 | 0 |
| 2 | 0 | 0 | 2 | 0 |

510

ROI-I (ROI_OFF)

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

CODEC AND DEVICES INCLUDING THE SAME

PRIORITY

This application claims priority under 35 U.S.C. § 119(a) to Korean Patent Application No. 10-2014-0123801, filed on Sep. 17, 2014, the content of which is incorporated herein by reference.

BACKGROUND

Embodiments of the present disclosure relate generally to a codec, and more particularly, to a codec, and a corresponding system on chip (SoC), for estimating the complexity of a current frame using previous frame information or initial information, and efficiently adjusting and encoding a region-of-interest (ROI) using the estimated complexity.

Methods are being sought to overcome quality deterioration caused by video compression in video transmission using an internet protocol (IP) network. Video transmission of mobile devices using an IP network requires relatively low bandwidths, which results in content with low image quality.

ROI coding is a method of encoding an ROI object, which is of interest to a user, in an image frame at a high bit rate by setting a low quantization parameter for the ROI object. The remaining region is encoded at a low bit rate by setting a relatively higher quantization parameter for the remaining region. When ROI coding is used for a region of interest in a mobile device, video images with improved quality are able to be obtained. However, when ROI coding is used for every video image, this results in excessive power consumption.

SUMMARY

The present disclosure has been made to address at least the above problems and/or disadvantages and to provide at least the advantages described below. According to an aspect of the present disclosure, a codec device, an SoC, and a method for coding a ROI block of a frame are provided.

Specifically, according to an embodiment of the present disclosure, a current frame is received, which includes a ROI object, and a type of the current frame is determined. A complexity of the current frame is estimated. An ROI control signal is generated for controlling ROI coding of the ROI object based on the complexity.

According to another embodiment of the present disclosure, ROI information of a current frame is generated in response to an ROI control signal, and a processed current frame is output. A complexity of the processed current is estimated and compared with a threshold value. The ROI control signal is generated according to a result of the comparison. Using the ROI control signal and the ROI information, a quantization parameter of each of a plurality of blocks included in the processed current frame is calculated while encoding each of the plurality of blocks, or the quantization parameter is adjusted in two steps.

Specifically, according to an embodiment of the present disclosure, a current frame is received, which includes a ROI object, and a type of the current frame is determined. A complexity of the current frame is estimated. An ROI control signal is generated for controlling ROI coding of the ROI object based on the complexity.

BRIEF DESCRIPTION OF THE DRAWINGS

The above and other aspects, features, and advantages of the present disclosure will become more apparent from the following detailed description when taken in conjunction with the accompanying drawings, in which:

FIGS. 2A and 2B are diagrams illustrating ROI information in accordance with an ROI control signal, according to an embodiment of the present disclosure;

DETAILED DESCRIPTION

Figure 1:
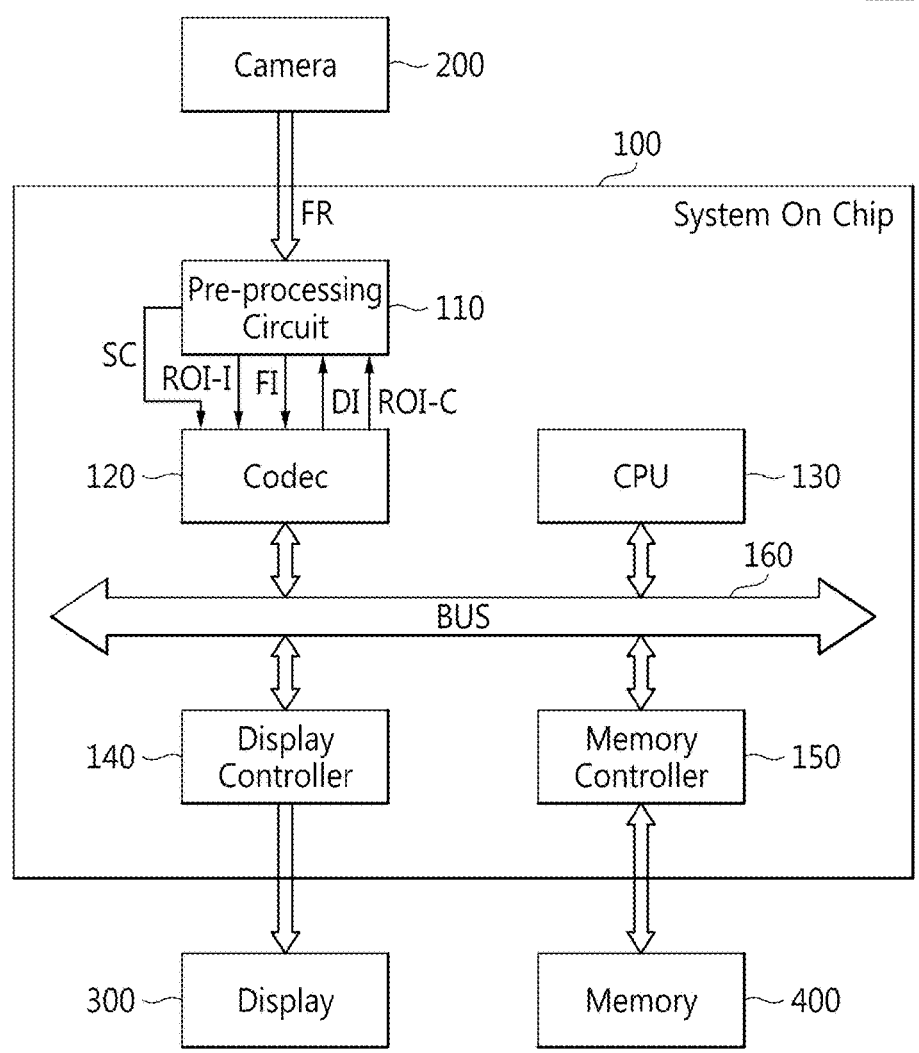
FIG. 1 is a block diagram illustrating an image data processing system, according to an embodiment of the present disclosure.

Embodiments of the present disclosure are described in detail with reference to the accompanying drawings. The same or similar components may be designated by the same or similar reference numerals although they are illustrated in different drawings. The size and relative sizes of layers and regions may be exaggerated in the drawings for clarity. Detailed descriptions of constructions or processes known in the art may be omitted to avoid obscuring the subject matter of the present disclosure.

When an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

Although the terms first, second, etc. may be used herein to describe various elements, these elements are not limited by these terms. These terms are only used to distinguish one element from another. For example, a first signal could be referred to as a second signal, and, similarly, a second signal could be referred to as a first signal without departing from the teachings herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meanings as those commonly understood by one of ordinary skill in the art to which this present disclosure belongs. It will be further understood that terms, such as those defined in commonly used dictionaries, should be interpreted as having meanings that are consistent with their meanings in the context of the relevant art and/or as used herein, and will not be interpreted in an idealized or overly formal sense unless expressly so defined herein.

FIG. 1 is a block diagram illustrating an image data processing system, according to an embodiment of the present disclosure. An image data processing system 10 may be implemented as, for example, a television (TV), a digital TV (DTV), an internet protocol TV (IPTV), a personal computer (PC), a desktop computer, a laptop computer, a computer workstation, a tablet PC, a video game platform (or a video game console), a server, or a portable electronic device. The portable electronic device may be embodied as a cellular phone, a smart phone, a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an internet of things (IoT) device, an internet of everything (IoE) device, or an e-book.

The image data processing system 10 may be any type of display that can process and display two-dimensional (2D) or three-dimensional (3D) graphics data. The image data processing system 10 includes a system on chip (SoC) 100, a camera 200, a display 300, and a memory 400. Although the memory 400 is provided outside the SoC 100 in the embodiment illustrated in FIG. 1, the memory 400 may be implemented inside the SoC 100 in other embodiments.

The SoC 100 controls the overall operation of the image data processing system 10. For example, the SoC 100 may be an integrated circuit (IC), a mother board, an application processor (AP), or a mobile AP, which can perform operations of embodiments of the inventive concept described herein.

Specifically, the SoC 100 processes image data, e.g., a frame FR output from the camera 200, and displays the processed data on the display 300 or stores the processed data in the memory 400. The image data output from the camera 200 is transmitted to a pre-processing circuit 110 through a camera serial interface (CSI). The SoC 100 includes the pre-processing circuit 110, a codec 120, a central processing unit (CPU) 130, a display controller 140, a memory controller 150, and a bus 160.

The codec 120, the CPU 130, the display controller 140, and the memory controller 150 communicate with one another through the bus 160. For example, the bus 160 may be implemented as a peripheral component interconnect (PCI) bus, a PCI express bus, an advanced microcontroller bus architecture (AMBA) bus, an advanced high-performance bus (AHB), an advanced peripheral bus (APB), an advanced extensible interface (AXI), or a combination thereof.

The pre-processing circuit 110 receives the first image data FR from the camera 200 and processes the first image data FR to output second image data FI to the codec 120. Each of the first image data FR and the second image data FI may be a frame or a frame data. Hereinafter, each of the first image data FR and the second image data FI is referred to as current frame.

The camera 200 may be implemented as a complementary metal-oxide semiconductor (CMOS) image sensor. The pre-processing circuit 110 may be implemented as an image signal processor (ISP).

The pre-processing circuit 110 extracts (or determines) an ROI object (or an ROI) from the current frame FR received from the camera 200 based on an ROI control signal ROI-C, received from the codec 120, which provides an instruction (or an indication) to enable ROI coding. The pre-processing circuit 110 generates ROI information ROI-I according to the extraction (or determination) result, and transmits the ROI information ROI-I to the codec 120.

The pre-processing circuit 110 is also able to detect a scene change based on the current frame FR received from the camera 200, generate scene change information SC according to the detection result, and transmit the scene change information SC to the codec 120. For example, the scene change information SC may be set in a flag. When a scene change is detected, the pre-processing circuit 110 generates a flag indicating logic "1" or data "1". When no scene change is detected, the pre-processing circuit 110 generates a flag indicating logic "0" or data '0'.

An ROI object is a region of interest to a user in the current frame FR. The ROI object requires better picture quality than a non-ROI object. The pre-processing circuit 110 performs an algorithm for extracting (or determining, or setting) an ROI object, based on the ROI control signal ROI-C. The ROI object that is extracted using the algorithm may include one or more blocks.

FIGS. 2A and 2B are diagrams illustrating the ROI information ROI-I in accordance with the ROI control signal ROI-C, according to an embodiment of the present disclosure. The pre-processing circuit 110 may generate the ROI information ROI-I in blocks illustrated in FIG. 2A based on the ROT control signal ROI-C, from the codec 120, which provides an instruction to turn on ROI. A block may have a size of 16×16, 32×32 or 64×64 pixels. The size of the block may vary with different embodiments.

Referring to FIG. 2A, a value "0" is information for maintaining a quantization parameter, a value "1" is information for decreasing a quantization parameter, and a value "2" is information for increasing a quantization parameter. For example, "0" may indicate a zero offset, "1" may indicate a minus offset, and "2" may indicate a plus offset. According to an embodiment, the offset may have a fixed value. For example, when information allocated to a block is represented with two bits, "0" may be "2b'00", "1" may be "2b'01", and "2" may be "2b'10". Each of blocks corresponding to an ROI object 510 may be set to "1". The numerals illustrated in the blocks of FIGS. 2A and 2B are just examples, and the inventive concept is not restricted to these examples.

The pre-processing circuit 110 does not perform extraction (or determination) of an ROI object (or a ROI) from the current frame FR when the ROI control signal ROI-C provides an instruction to disable ROI coding. Thus, the pre-processing circuit 110 generates the ROI information ROI-I in blocks shown in FIG. 2B.

The pre-processing circuit 110 begins processing a subsequent frame in response to a current frame encoding end signal DI received from the codec 120. Specifically, the pre-processing circuit 110 may generate the ROI information ROI-I in blocks, as shown in FIGS. 2A and 2B, with respect to the subsequent frame based on the ROI control signal ROI-C. Although the pre-processing circuit 110 is implemented within the SoC 100 in the embodiments illustrated in FIG. 1, the pre-processing circuit 110 may be provided outside the SoC 100 in other embodiments.

When no scene change is detected, the codec 120 estimates the complexity of the current frame FI based on information about a previous frame, generates the ROI control signal ROI-C based on the estimation result, and calculates a quantization parameter for each block included in the current frame FI based on the ROI information ROI-I or adjust the calculated quantization parameter in two steps.

Figure 6:
FIG. 6A to 6D are diagrams of the operation of a calculator illustrated in FIG. 4, according to an embodiment of the present disclosure.

However, when a scene change is detected, the codec 120 estimates the complexity of the current frame FI based on initial information, generates the ROI control signal ROI-C based on the estimation result, and calculates a quantization parameter for each block included in the current frame FI based on the ROI information ROI-I or adjusts the calculated quantization parameter in two steps. A method of adjusting the calculated quantization parameter in two steps is described in detail below with reference to FIGS. 6 and 7.

The codec 120 performs encoding on each block included in the current frame FI and transmits the current frame encoding end signal DI to the pre-processing circuit 110 when the encoding of the current frame FI is complete. Although the codec 120 is implemented in hardware in the embodiment illustrated in FIG. 1, a codec may be implemented in software and executed by the CPU 130 in other embodiments of the inventive concept.

The CPU 130 controls the operation of the SoC 100. A user is allowed to provide an input for the SoC 100 so that the CPU 130 can execute one or more applications (e.g., software applications). Applications executed by the CPU 130 may include an operating system (OS), a word processor application, a media player application, a video game application, and/or a graphical user interface (GUI) application.

The display controller 140 displays image data output from the codec 120 or the CPU 130 on the display 300. The display 300 may be implemented as a monitor, a TV monitor, a projection device, a thin film transistor-liquid crystal display (TFT-LCD), a light emitting diode (LED) display, organic LED (OLED) display, an active matrix OLED (AMOLED) display, or a flexible display. The display controller 140 may transmit image data to the display 300 through a display serial interface (DSI).

The memory controller 150 reads data from the memory 400 based on a command from the codec 120 or the CPU 130 and transmits the data to the codec 120 or the CPU 130. The memory controller 150 writes data output from the codec 120 or the CPU 130 to the memory 400 based on a command from the codec 120 or the CPU 130.

The memory 400 may be embodied as a volatile or non-volatile memory. The volatile memory may be a random access memory (RAM), a static RAM (SRAM), a dynamic RAM (DRAM), a synchronous DRAM (SDRAM), a thyristor RAM (TRAM), a zero capacitor RAM (Z-RAM), or a twin transistor RAM (TTRAM). The non-volatile memory may be an electrically erasable programmable read-only memory (EEPROM), a flash memory, a magnetic RAM (MRAM), a spin-transfer torque MRAM, a ferroelectric RAM (FeRAM), a phase-change RAM (PRAM), or a resistive RAM (RRAM). The non-volatile memory may be implemented as a multimedia card (MMC), an embedded MMC (eMMC), a universal flash storage (UFS), a solid state drive (SSD), a universal serial bus (USB) flash drive, or a hard disk drive (HDD).

Figure 3:
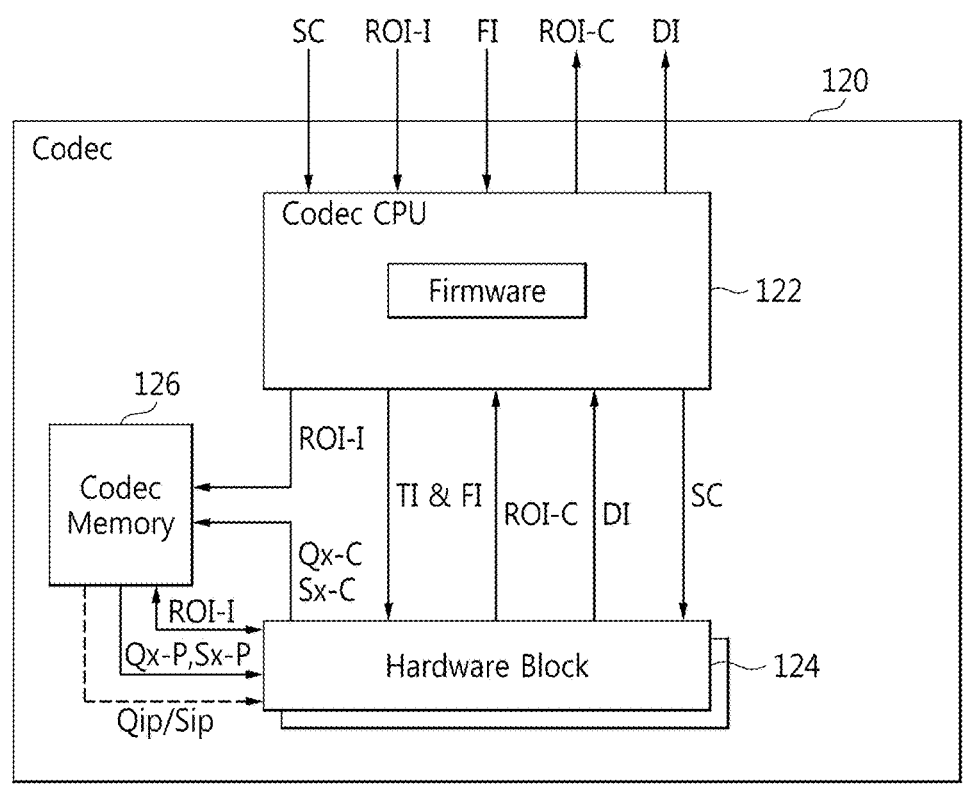
FIG. 3 is a diagram of a codec illustrated in FIG. 1, according to an embodiment of the present disclosure.

FIG. 3 is a diagram illustrating the codec of FIG. 1, according to an embodiment of the present disclosure. The codec 120 includes a codec CPU 122, a hardware block 124, and a codec memory 126.

The codec CPU 122 stores the ROI information ROI-I output from the pre-processing circuit 110 in the codec memory 126. Alternatively, the codec CPU 122 may store initial information output from the pre-processing circuit 110 in the codec memory 126. The codec CPU 122 determines a type of the current frame FI and outputs type information TI, the current frame FI, and the scene change information SC to the hardware block 124.

Firmware executed in the codec CPU 122 determines whether the current frame FI is an i-frame, a b-frame, or a p-frame, according to the characteristics of a group of pictures (GOP). The codec CPU 122 generates the type information TI according to the determination result.

A GOP may include at least one of an i-frame, a b-frame, and a p-frame. All frames included in a GOP may be i-frames. The number of frames included in a GOP and/or an order in which different types of frames are transmitted from the pre-processing circuit 110 may be modified in various ways in different embodiments. The codec CPU 122 transmits the ROI control signal ROI-C and the current frame encoding end signal DI, received from the hardware block 124, to the pre-processing circuit 110.

The hardware block 124 may or may not read the ROI information ROI-I from the codec memory 126. When no scene change has occurred, the hardware block 124 may or may not read a previous frame's average quantization parameter Qx-P and a bit count Sx-P corresponding to the number of bits generated when the previous frame is compressed from the codec memory 126. When a scene change has occurred, the hardware block 124 may or may not read initial information, e.g., an initial quantization parameter Qip and an initial bit count Sip, from the codec memory 126.

The hardware block 124 stores a current frame's average quantization parameter Qx-C and a bit count Sx-C corresponding to the number of bits generated when the previous frame is compressed in the codec memory 126. As described above, the codec memory 126 may be formed with volatile or non-volatile memory.

Figure 4:
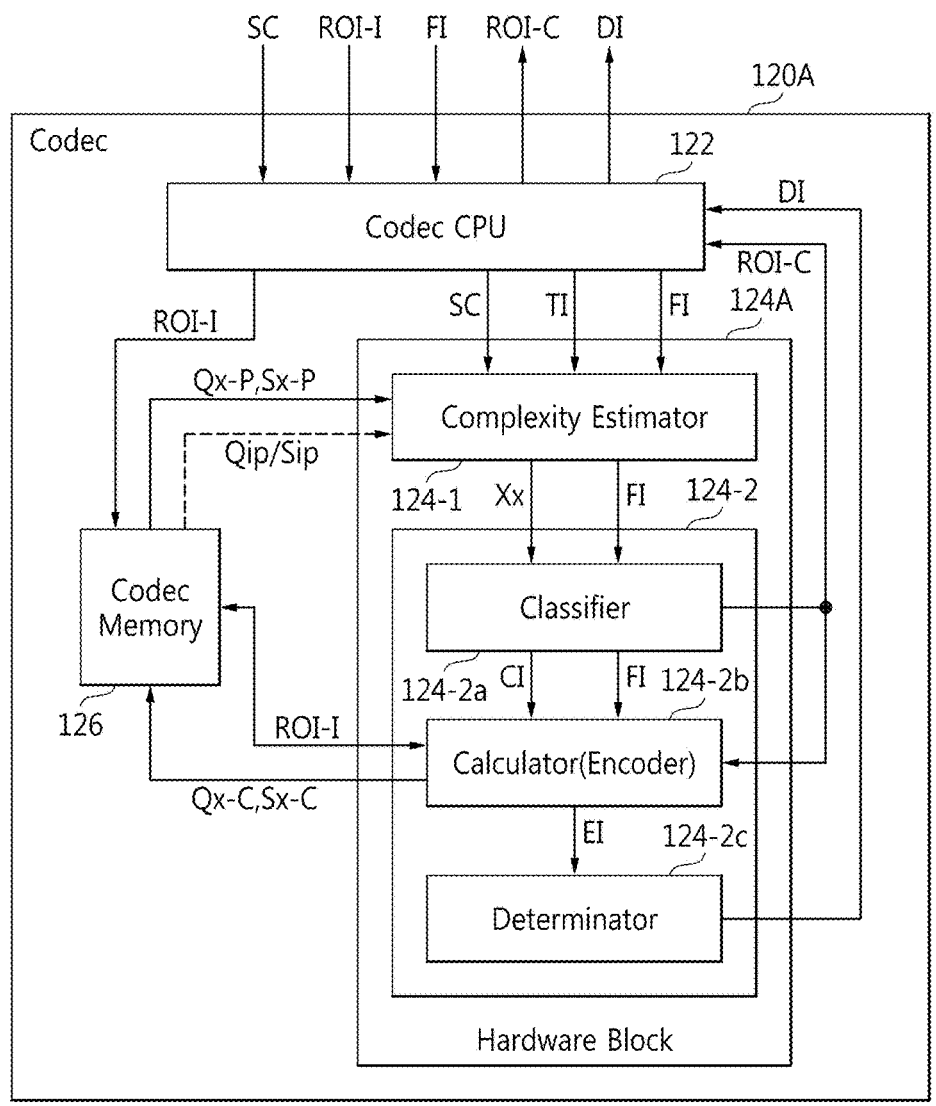
FIG. 4 is a block diagram of the codec illustrated in FIG. 3, according to an embodiment of the present disclosure.

FIG. 4 is a block diagram illustrating the codec of FIG. 3, according to an embodiment of the present disclosure. Referring to FIG. 4, a codec 120A includes the codec CPU 122, an ROI controller (hardware block) 124A, and the codec memory 126. The codec 120A is an example of the codec 120 illustrated in FIG. 1.

When no scene change has occurred, the ROI controller 124A calculates a complexity Xx of the current frame FI based on the previous frame information Qx-P and Sx-P, generates classification information CI based on the complexity Xx, and calculates a quantization parameter for each of the blocks included in the current frame FI.

Additionally, when no scene change has occurred, the ROI controller 124A performs a first adjustment operation on the quantization parameter of each block based on the ROI information ROI-I, and performs a second adjustment operation on the quantization parameter of the block that has been subjected to the first adjustment operation using an adjustment value related with the classification information CI.

However, when a scene change has occurred, the ROI controller 124A calculates the complexity Xx of the current frame FI based on the initial information Qip and Sip, generates the classification information CI based on the complexity Xx, calculates a quantization parameter for each of the blocks included in the current frame FI, performs a first adjustment operation on the quantization parameter of each block based on the ROI information ROI-I, and performs a second adjustment operation on the quantization parameter of the block that has been subjected to the first adjustment operation using an adjustment value related with the classification information CI.

The ROI controller 124A includes a complexity estimator 124-1 and a ROI control signal generator 124-2. The complexity estimator 124-1 receives the type information TI, the current frame FI, and the scene change information SC. The complexity estimator 124-1 also reads the previous frame's average quantization parameter Qx-P and the bit count Sx-P corresponding to the number of bits generated when the previous frame is compressed, or the initial quantization parameter Qip and the initial bit count Sip from the codec memory 126 based on the type information TI and the scene change information SC.

The complexity estimator 124-1 calculates the complexity Xx of the current frame FI using Equation (1) below:

$$Xx=(Qx\text{-}P)*(Sx\text{-}P) \text{ or } Xx=Qip*Sip, \quad (1)$$

where "x" may be "i", "b", or "p".

For example, when the type information TI indicates an i-frame, the complexity estimator 124-1 reads, from the codec memory 126, an average quantization parameter Qi-P of a previous i-frame and a bit count Si-P generated when the previous i-frame is compressed.

When the type information TI indicates a b-frame, the complexity estimator 124-1 reads, from the codec memory 126, an average quantization parameter Qb-P of a previous b-frame and a bit count Sb-P generated when the previous b-frame is compressed.

When the type information TI indicates a p-frame, the complexity estimator 124-1 reads, from the codec memory 126, an average quantization parameter Qp-P of a previous p-frame and a bit count Sp-P generated when the previous p-frame is compressed. The codec memory 126 stores the average quantization parameter Qi-P of the previous i-frame and the bit count Si-P generated when the previous i-frame is compressed, the average quantization parameter Qb-P of the previous b-frame and the bit count Sb-P generated when the previous b-frame is compressed, and/or the average quantization parameter Qp-P of the previous p-frame and the bit count Sp-P generated when the previous p-frame is compressed.

As the complexity Xx of the current frame FI increases, the complexity and difficulty in encoding of the current frame FI also increases.

The ROI control signal generator 124-2 includes a classifier 124-2a, a calculator 124-2b, and a determinator 124-2c. For example, the ROI control signal generator 124-2 controls ROI coding of the ROI object based on the complexity. The calculator 124-2b includes a function of an encoder, which performs encoding on each block. The ROI control signal generator 124-2 generates the classification information CI based on the complexity Xx, and calculates a quantization parameter of each block included in the current frame FI.

The ROI control signal generator 124-2 also performs a first adjustment operation on the quantization parameter of each block based on the ROI information ROI-I, and performs a second adjustment operation on the quantization parameter of each block that has been subjected to the first adjustment operation using an adjustment value related to the classification information CI.

The classifier 124-2a classifies the current frame FI into one of a plurality of categories based on the complexity Xx, and outputs the classification information CI and the current frame FI to the calculator 124-2b.

Figure 5:
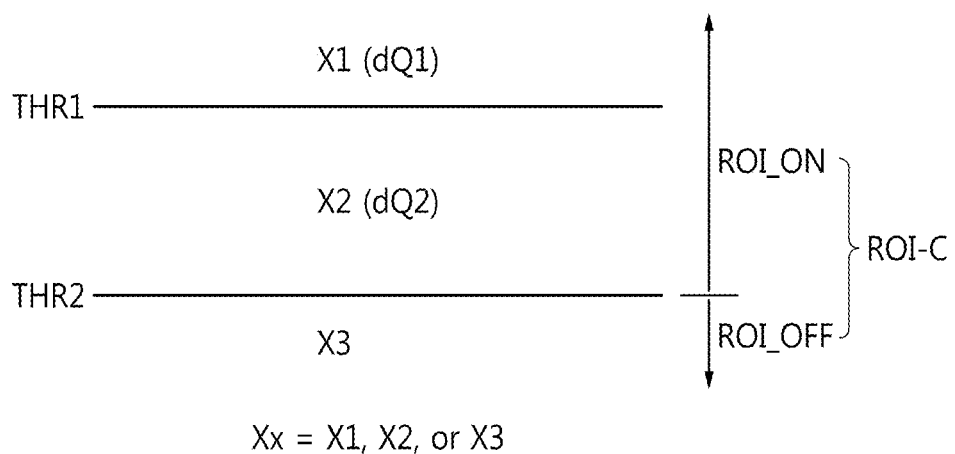
FIG. 5 is a diagram of the operation of a classifier illustrated in FIG. 4, according to an embodiment of the present disclosure.

FIG. 5 is a diagram of the operation of a classifier illustrated in FIG. 4, according to an embodiment of the present disclosure.

When a complexity X1 (Xx, where x=1) of the current frame FI is greater than or equal to a first threshold value THR1 (i.e., X1≥THR1), the classifier 124-2a classifies the current frame FI into a first category. The classifier 124-2a outputs the ROI control signal ROI-C, which instructs the codec CPU 122 and the calculator 124-2b to turn on the ROI. For example, the complexity X1 may be related with a first adjustment value dQ1.

When a complexity X2 (Xx, where x=2) of the current frame FI is less than the first threshold value THR1 and greater than or equal to a second threshold value THR2 (i.e., THR2≤X<THR1), the classifier 124-2a classifies the current frame FI into a second category. The classifier 124-2a outputs the ROI control signal ROI-C, which instructs the codec CPU 122 and the calculator 124-2b to turn on the ROI. For example, the complexity X2 may be related with a second adjustment value dQ2. The second adjustment value dQ2 is less than the first adjustment value dQ1.

When a complexity X3 (Xx, where x=3) of the current frame FI is less than the second threshold value THR2 (i.e., X3<THR2), the classifier 124-2a classifies the current frame FI into a third category. The classifier 124-2a outputs the ROI control signal ROI-C, which instructs the codec CPU 122 and the calculator 124-2b to disable ROI coding.

Referring back to FIG. 4, the calculator 124-2b reads the ROI information ROI-I from the codec memory 126 in response to receiving the ROI control signal ROT-C, which instructs to enable ROI coding. However, the calculator 124-2b does not read the ROI information ROI-I from the codec memory 126 in response to the ROI control signal ROI-C, which instructs to disable ROI coding.

When the ROI control signal ROI-C instructs or indicates to disable ROI coding, the calculator 124-2b calculates a quantization parameter of each of block included in the current frame FI while encoding the each of blocks. The calculator 124-2b then calculates the average quantization parameter Qx-C of the current frame FI and the bit count Sx-C when the current frame is compressed, and stores the average quantization parameter Qx-C and the bit count Sx-C in the codec memory 126.

FIGS. 6A to 6D are diagrams illustrating the operation of the calculator of FIG. 4, according to an embodiment of the present disclosure. It is assumed that the ROI control signal ROI-C provides an instruction to turn on the ROI and that the complexity Xx is of a first category. Referring to FIG. 4 and FIG. 6A, the calculator 124-2b calculates quantization parameters QP1 through QP25 of a plurality of blocks, respectively, included in the current frame FI while encoding the blocks.

Referring to FIG. 4, FIG. 6B, and FIG. 6C, the calculator 124-2b adjusts the quantization parameters QP1 through QP25 using an offset of 0, 1, or 2 for each of the blocks included in the ROI information ROI-I.

As described with reference to FIG. 2A, the calculator 124-2b increases or decreases each of quantization parameters QP4', QP5', QP7' through QP15', QP17' through QP19', QP21', and QP24' of respective blocks, which correspond to "1" or "2". However, the calculator 124-2b maintains the quantization parameters QP1 through QP3, QP6, QP16, QP20, QP22, QP23, and QP25 of respective blocks each corresponding to "0". In addition, the calculator 124-2b decreases quantization parameters of blocks included in the ROI object 510.

Referring to FIG. 4 and FIG. 6D, the calculator 124-2b readjusts a quantization parameter of each block illustrated in FIG. 6C using the first adjustment value dQ1.

Figure 7:
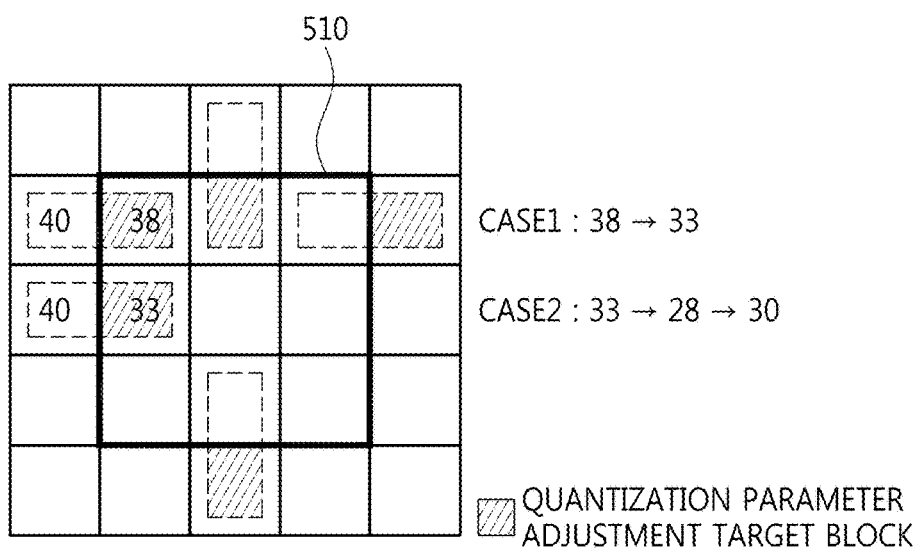
FIG. 7 is a diagram of a method of adjusting a quantization parameter at a border region, according to an embodiment of the present disclosure.

FIG. 7 is a diagram illustrating a method of adjusting a quantization parameter at a border region, according to an embodiment of the present disclosure. Five block groups are illustrated in the border region between the ROI object 510 and a non-ROI object. Among two corresponding quantization parameters that include the border region, a quantization parameter of a current block is a target of adjustment. In FIG. 7, quantization parameters of hatched blocks, i.e., the right or lower block of each block group, are adjustment target parameters.

For example, when the first adjustment value dQ1 is "10", a minus offset corresponding to "1" is "−5", the quantization parameter QP6 in FIG. 6A is 40, and the quantization parameter QP7 in FIG. 6A is 38, the calculator 124-2b calculates the adjusted quantization parameter QP7', i.e., 33 (=38−5) using the ROI information ROI-I (i.e., "1") and the minus offset. A difference between the two quantization parameters QP6 and QP7' is 7 (=40−33), and therefore, the quantization parameter QP7', i.e., 33 is maintained (CASE 1).

When the quantization parameter QP11' in FIG. 6C is 40 and the quantization parameter QP12' is 33, the calculator 124-2b calculates the adjusted quantization parameter QP12", i.e., 28 (=33−5) using the ROI information ROI-I (i.e., "1"). Since a difference between the two quantization parameters QP11' and QP12" is 12 (=40−28), the calculator 124-2b increases the quantization parameter QP12" to 30 so that the difference between the two quantization parameters QP11' and QP12" is less than or equal to the first adjustment value dQ1 (="10") (CASE 2).

Referring back to FIG. 4, the calculator 124-2b calculates a quantization parameter for each of the blocks of the current frame FI and adjusts the quantization parameter in two steps. When encoding of the last block of the blocks is completed, the calculator 124-2b transmits an end signal EI to the determinator 124-2c. The determinator 124-2c transmits the current frame encoding end signal DI to the codec CPU 122 based on the end signal EI.

Figure 8:
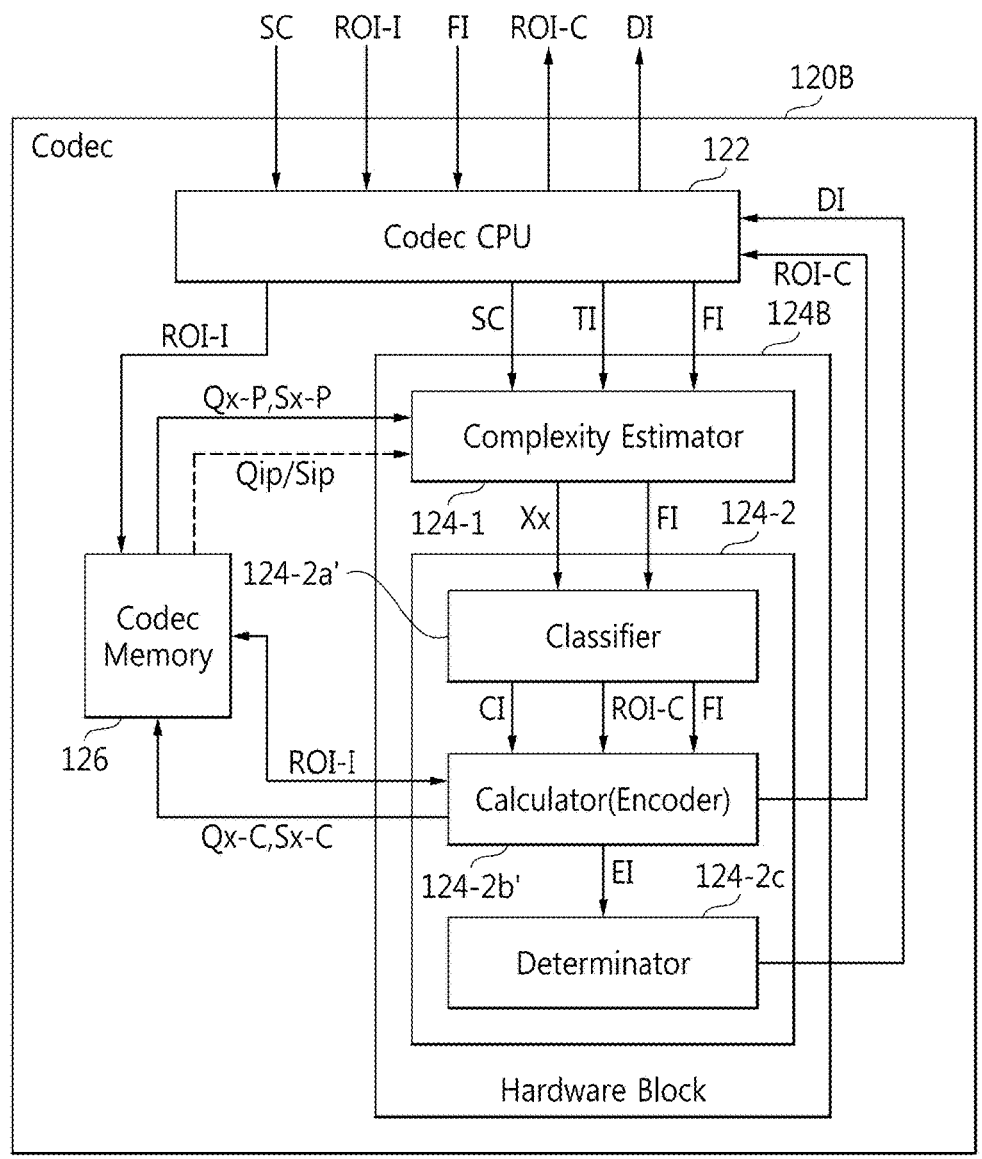
FIG. 8 is a block diagram of the codec illustrated in FIG. 3, according to another embodiment of the present disclosure.

FIG. 8 is a block diagram illustrating the codec 120 of FIG. 3, according to another embodiment of the present disclosure. Referring to FIG. 8, a codec 120B includes the codec CPU 122, an ROI controller 124B, and the codec memory 126. The codec 120B is another example of the codec 120 illustrated in FIG. 1.

Referring to FIG. 8, the ROI control signal ROI-C generated from a classifier 124-2a' is transmitted to the codec CPU 122 via a calculator 124-2b'. Apart from the transmission path of the ROI control signal ROI-C, the operation of the classifier 124-2a' is substantially the same as or similar to that of the classifier 124-2a of FIG. 4, and the operation of the calculator 124-2b' is substantially the same as or similar to that of the calculator 124-2b of FIG. 4.

Figure 9:
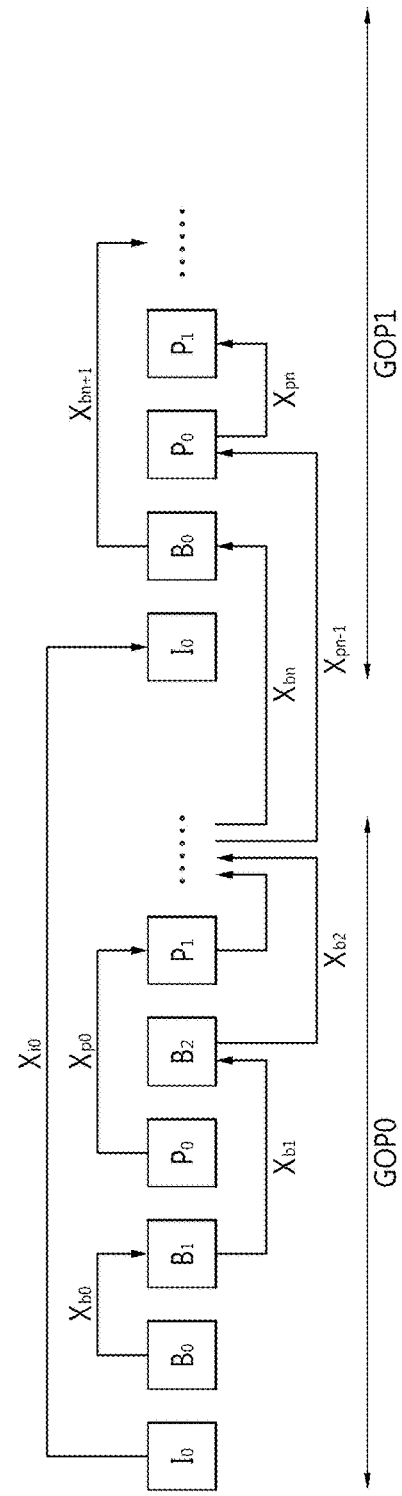
FIG. 9 is a diagram of a method of estimating a complexity of each of a plurality of frames included in a group of pictures (GOP), according to an embodiment of the present disclosure.

FIG. 9 is a diagram illustrating a method of estimating a complexity of each of a plurality of frames included in a GOP, according to an embodiment of the present disclosure. Referring to FIG. 9, a first image group GOP0 includes an i-frame $I_0$, a plurality of b-frames $B_0$, $B_1$, $B_2$, . . . , and a plurality of p-frames $P_0$, $P_1$, . . . . A second image group GOP1 includes the i-frame $I_0$, a plurality of b-frames $B_0$ . . . , and a plurality of p-frames $P_0$, $P_1$, . . . .

When a scene change has occurred in the current frame FI or when the average quantization parameter Qx-P of a previous frame and the bit count Sx-P of the compressed previous frame cannot be used, the complexity estimator 124-1 skips the estimation process (or setting process) for the complexity Xx of the current frame FI as greater than the second threshold value THR2 or estimation process of the complexity Xx of the current frame FI. For example, previous frame information cannot be used for the i-frame $I_0$, the b-frame $B_0$, and the p-frame $P_0$ in the first image group GOP0, and therefore, the classifier 124-2a or 124-2a' generates the ROI control signal ROI-C, which provides an instruction to turn on the ROI.

A complexity of the i-frame $I_0$ in the second image group GOP1 can be estimated using a complexity $X_{i0}$ of the i-frame $I_0$ in the first image group GOP0. A complexity of the b-frame $B_1$ in the first image group GOP0 can be estimated using a complexity $X_{b0}$ of the previous b-frame $B_0$. A complexity of the p-frame $P_1$ in the first image group GOP0 can be estimated using a complexity $X_{p0}$ of the previous p-frame $P_0$. A complexity of the b-frame $B_2$ in the first image group GOP0 can be estimated using a complexity $X_{b1}$ of the previous b-frame $B_1$. A complexity of the p-frame $P_1$ in the second image group GOP1 can be estimated using a complexity $X_{pn}$ of the previous p-frame $P_0$ in the second image group GOP1. A complexity of p-frame $P_2$ in the first image group GOP0 can be estimated using a complexity $X_{p1}$ of the previous p-frame $P_1$. A complexity of b-frame $B_3$ in the first image group GOP0 can be estimated using a complexity $X_{b2}$ of the previous b-frame $B_2$. A complexity of p-frame $P_0$ in the second image group GOP1 can be estimated using a complexity $X_{pn-1}$ of the previous p-frame $P_{n-1}$ in the first image group GOP0. A complexity of b-frame $B_0$ in the second image group GOP1 can be estimated using a complexity $X_{bn}$ of the previous b-frame $B_n$ in the first image group GOP0. A complexity of b-frame $B_1$ in the second image group GOP1 can be estimated using a complexity $X_{bn+1}$ of the previous b-frame $B_{n+1}$ in the second image group GOP1.

Figure 10A:
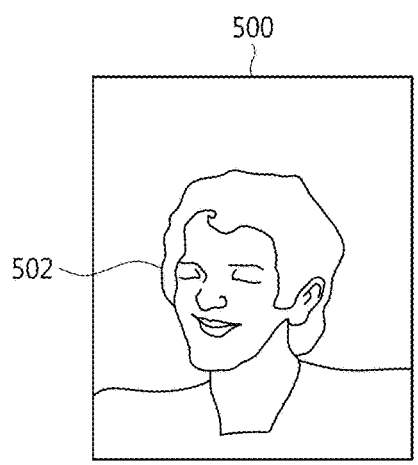
FIGS. 10A and 10B are diagrams of a current frame including an ROI object and a non-ROI object, according to an embodiment of the present disclosure.
Figure 10B:
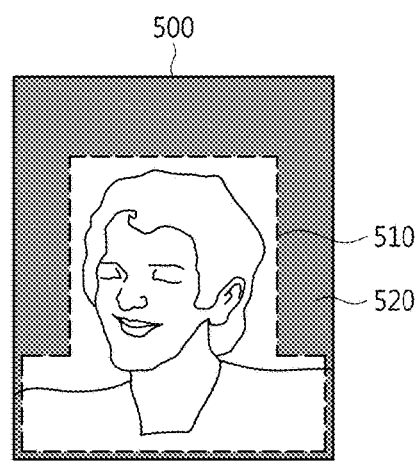

FIGS. 10A and 10B are diagrams illustrating a current frame including an ROI object and a non-ROI object, according to an embodiment of the present disclosure. FIG. 10A shows a current frame 500 including an image of a person 502. Referring to FIG. 10B, the pre-processing circuit 110 sets a region including a face and upper body of the person's image 502 as an ROI object 510 and sets a remaining portion of the current frame 500 as a non-ROI object 520. The calculator 124-2b or 124-2b' calculates or adjusts a quantization parameter of each block included in the ROI object 510.

Figure 11:
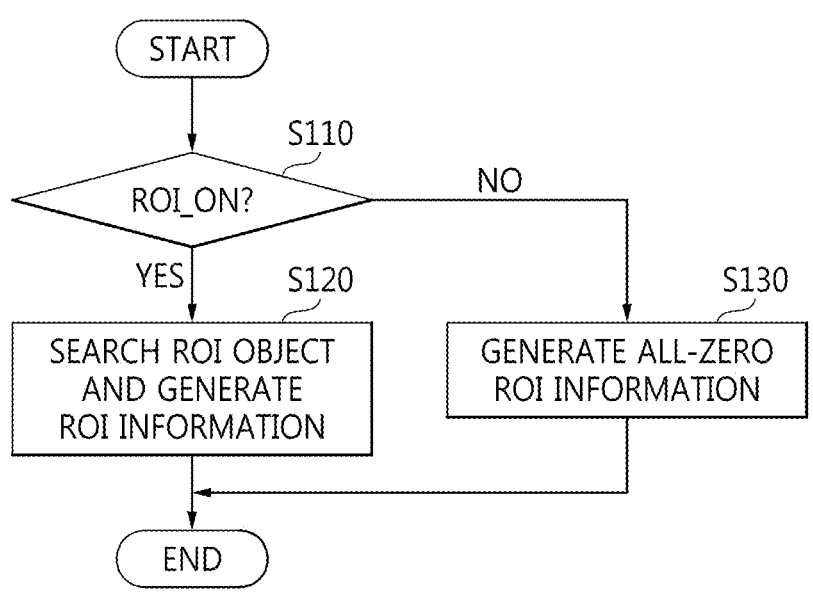
FIG. 11 is a flowchart illustrating the operation of a pre-processing circuit illustrated in FIG. 1, according to an embodiment of the present disclosure.

FIG. 11 is a flowchart illustrating the operation of the pre-processing circuit 110 of FIG. 1, according to an embodiment of the present disclosure. Referring to FIGS. 1 and 11, the pre-processing circuit 110 determines whether the ROI control signal ROI-C provides an instruction to enable or disable ROI coding, in step S110.

When the ROI control signal ROI-C provides an instruction to turn on ROI, the pre-processing circuit 110 extracts (or determines) an ROI object (or an ROI) from the current frame FR, generates the ROI information ROI-I, as shown in FIG. 2A, according to the extraction (or determination)

result, and transmits the ROI information ROI-I to the codec 120, in step S120. When the ROI control signal ROI-C provides an instruction to disable ROI coding, the pre-processing circuit 110 generates the ROI information ROI-I including all zeros, as shown in FIG. 2B, without extracting (or determining) an ROI object from the current frame FR, and transmits the ROI information ROI-I to the codec 120, in step S130.

Figure 12:
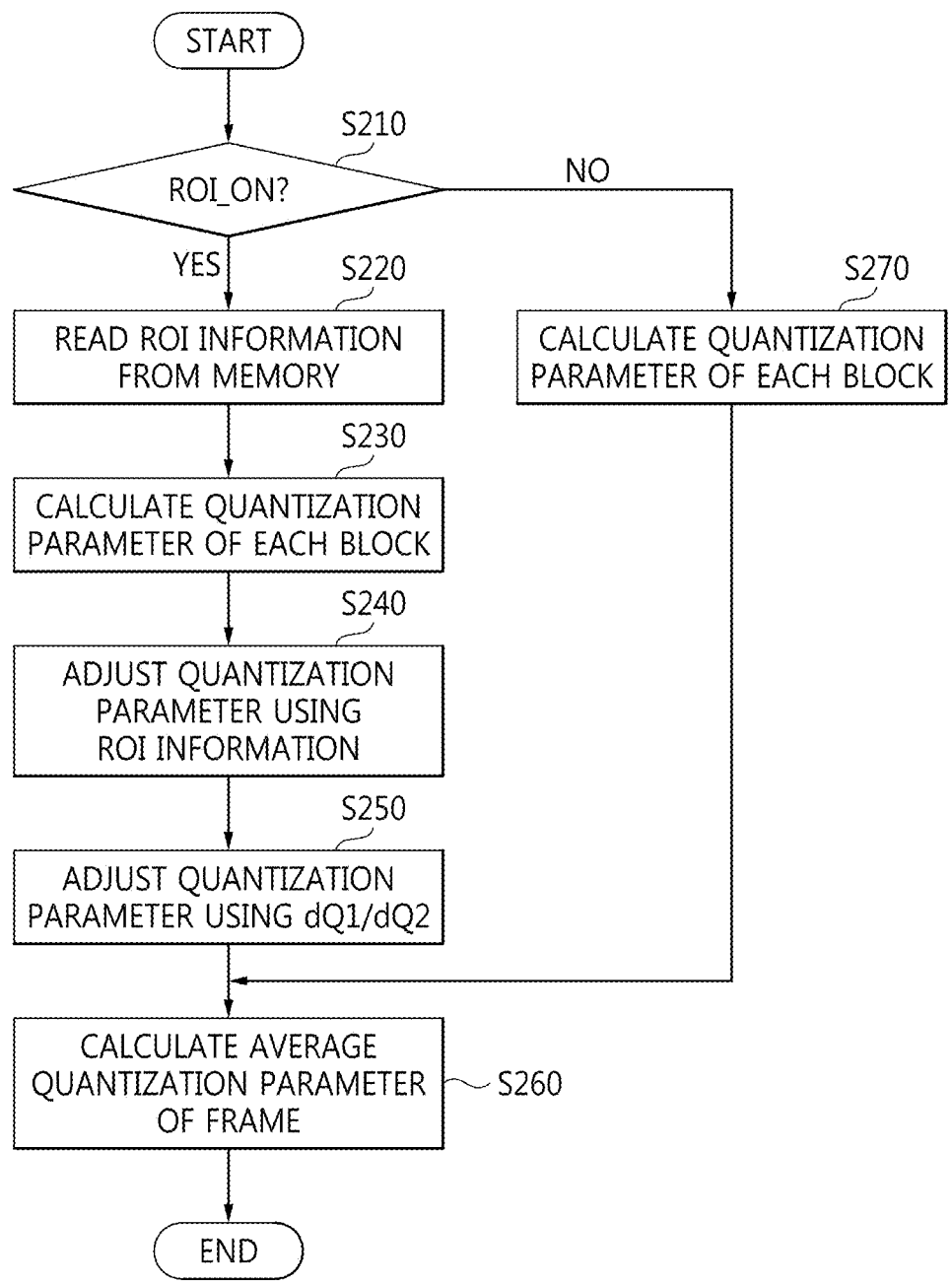
FIG. 12 is a flowchart illustrating the operation of the calculator illustrated in FIG. 4, according to an embodiment of the present disclosure.

FIG. 12 is a flowchart illustrating the operation of the calculator of FIG. 4, according to an embodiment of the present disclosure. Referring to FIGS. 4, 6A-6D, 8, and 12, the calculator 124-2b or 124-2b' determines whether the ROI control signal ROI-C generated by the classifier 124-2a or 124-2a', provides an instruction to enable ROI coding or disable ROI coding, in step S210.

When the ROI control signal ROI-C provides an instruction to turn on the ROI coding, the calculator 124-2b or 124-2b' reads the ROI information ROI-I from the codec memory 126, in step S220, and calculates a quantization parameter of each block included in the current frame FI, in step S230. The calculator 124-2b or 124-2b' adjusts the quantization parameter of at least one of the blocks using the ROI information ROI-I, in step S240.

The calculator 124-2b or 124-2b' re-adjusts the quantization parameter of the at least one block, which has been adjusted in step S240, using the first adjustment value dQ1 or the second adjustment value dQ2, in step S250. The calculator 124-2b or 124-2b' calculates an average quantization parameter of the current frame FI and stores the average quantization parameter in the codec memory 126, in step S260.

When the ROI control signal ROI-C provides an instruction to disable ROI coding, the calculator 124-2b or 124-2b' calculates the quantization parameter of each of the blocks included in the current frame FI, without reading the ROI information ROI-I from the codec memory 126, in step S270.

Figure 13:
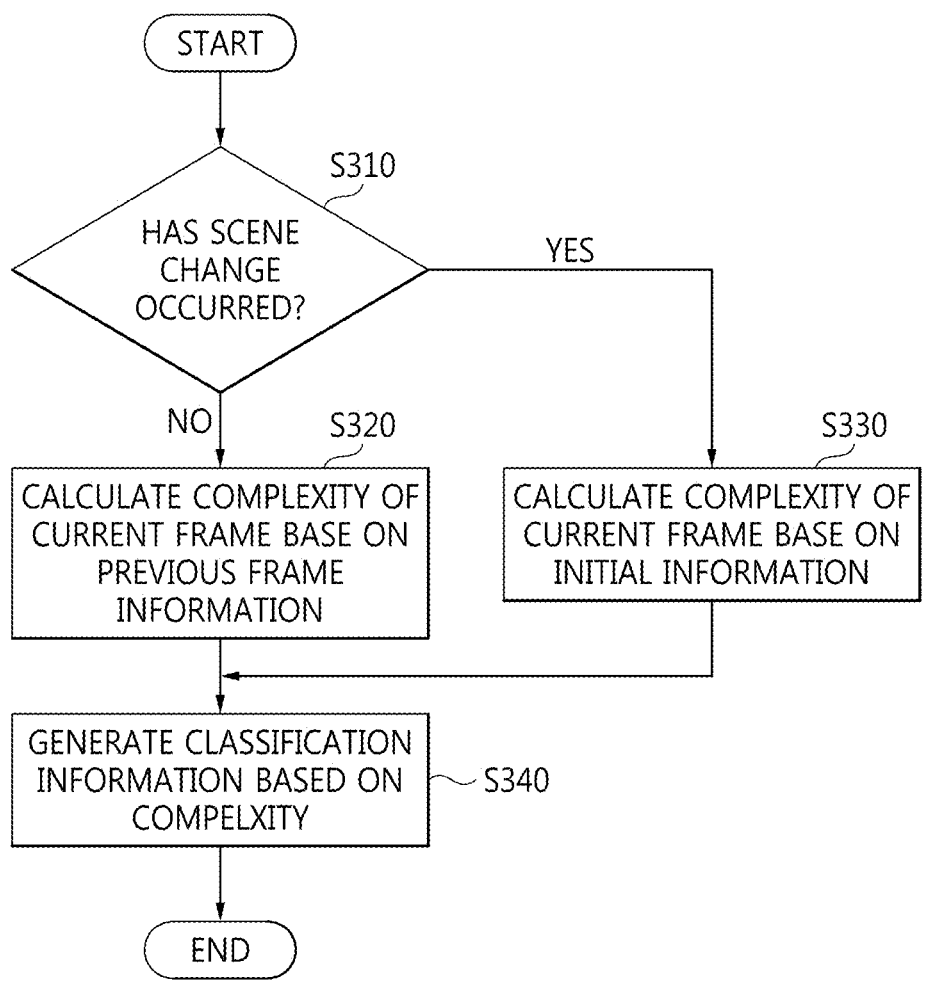
FIG. 13 is a flowchart illustrating the operations of the pre-processing circuit and the codec illustrated in FIG. 1, according to an embodiment of the present disclosure.

FIG. 13 is a flowchart illustrating the operations of the pre-processing circuit and the codec of in FIG. 1, according to an embodiment of the present disclosure. Referring to FIGS. 1, 3, 4, 8, and 13, the pre-processing circuit 110 determines whether a scene change has occurred in the current frame FR and transmits the scene change information SC to the codec 120 according to the determination result, in step S310.

When it is determined that a scene change has not occurred, the ROI controller 124A or 124B calculates the complexity Xx of the current frame FI based on the previous frame information Qx-P and Sx-P, in step S320. When it is determined that a scene change has occurred, the ROI controller 124A or 124B calculates the complexity Xx of the current frame FI based on the initial information Qip and Sip, in step S330. The ROI controller 124A or 124B generates the classification information CI based on the calculated complexity Xx, in step S340.

As described above, according to embodiments of the present disclosure, a codec and devices including the same estimate a complexity of a current frame using previous frame information and determine whether to use ROI coding for a ROI object based on the estimated complexity, thereby increasing the picture quality of the ROI object and reducing power consumption.

While the present disclosure has been shown and described with reference to certain embodiments thereof, it will be understood by those skilled in the art that various changes in form and detail may be made therein without departing from the spirit and scope of the present disclosure as defined by the following claims.

What is claimed is:

1. A codec device comprising:
a codec central processing unit (CPU) configured to receive a current frame, which includes a region-of-interest (ROI) information generated in response to an ROI control signal, determine a type of the current frame and output the type of the current frame;
a complexity estimator configured to receive the type of the current frame from the codec CPU, estimate a complexity of the current frame and output the complexity; and
an ROI control signal generator configured to receive the complexity of the current frame, and generate the ROI control signal indicating whether ROI coding of an ROI object is enabled or disabled, based on the complexity which is estimated in the complexity estimator,
wherein the ROI control signal generator is further configured to adjust a quantization parameter of each of a plurality of blocks included in the current frame based on ROI information, in response to the ROI control signal indicating the ROI coding is enabled,
wherein the complexity estimator is further configured to estimate the complexity of the current frame using an average quantization parameter of a previous frame and a number of bits generated when the previous frame is compressed, which are stored in a codec memory, when received scene change information indicates that a scene change has not occurred; and
wherein the complexity estimator is further configured to estimate the complexity of the current frame using initial information stored in the codec memory, when the received scene change information indicates that the scene change has occurred.

2. The codec device of claim 1, wherein the ROI control signal generator comprises:
a classifier configured to classify the current frame into one of a plurality of categories according to the complexity, and output the ROI control signal and classification information related to the one of the plurality of categories; and
a calculator configured to receive the ROI control signal and the classification information, and perform, according to the ROI control signal, one of:
an operation of calculating the quantization parameter of each of the plurality of blocks included in the current frame while encoding each of the blocks, and
operations of adjusting a quantization parameter of one or more blocks according to the ROI information, and re-adjusting a quantization parameter of at least one of the one or more blocks using an adjustment value corresponding to the classification information.

3. The codec device of claim 2, wherein the classifier is further configured to generate the ROI control signal indicating the ROI coding is enabled, when the complexity is greater than or equal to a first threshold value, and generate the ROI control signal indicating the ROI coding is disabled, when the complexity is less than the first threshold value.

4. The codec device of claim 3, wherein the calculator is further configured to read the ROI information from a codec memory in response to the ROI control signal indicating the ROI coding is enabled, calculate the quantization parameter of a block of the current frame, adjust the quantization parameter according to the ROI information, and re-adjust the adjusted quantization parameter using the adjustment value corresponding to the classification information.

5. The codec device of claim 4, wherein the ROI information decreases the quantization parameter when the block corresponds to the ROI object, and increases or maintains the quantization parameter when the block does not correspond to the ROI object.

6. The codec device of claim 4, wherein the quantization parameter is re-adjusted when a difference between a quantization value of the block and a quantization value of a neighboring block is greater than the adjustment value.

7. The codec device of claim 3, wherein the calculator is further configured to calculate the quantization parameter in response to the ROI control signal indicating the ROI coding is enabled.

8. The codec device of claim 3, wherein the classifier is further configured to classify the current frame into a first group when the complexity less than the first threshold value, classify the current frame into a second group corresponding to a first adjustment value when the complexity is greater than or equal to a second threshold value, and classify the current frame into a third group corresponding to a second adjustment value when the complexity is greater than or equal to the firs threshold value and less than the second threshold value.

9. A system on chip (SoC) comprising:
a pre-processing circuit configured to generate region-of-interest (ROI) information of a current frame in response to an ROI control signal, and output a processed current frame; and
a codec device configured to estimate a complexity of the processed current frame, compare the complexity with a threshold value, generate the ROI control signal indicating whether ROI coding of the current frame is enabled or disabled, according to a result of the comparison, and perform, using the ROI control signal and the ROI information, one of:
an operation of calculating a quantization parameter of each of a plurality of blocks included in the processed current frame while encoding each of the plurality of blocks in response to the ROI control signal indicating the ROI coding is disabled; and
an operation of adjusting the quantization parameter in two steps in response to the ROI control signal indicating the ROI coding is enabled,
wherein the codec device comprises:
a codec memory;
a codec central processing unit (CPU) configured to store the ROI information in the codec memory, receive the processed current frame, which includes an ROI object, and determine a type of the processed current frame;
a complexity estimator configured to receive the type of the current frame from the coder CPU, and estimate the complexity of the processed current frame; and
an ROI control signal generator configured receive the complexity of the current frame, and generate the ROI control signal based on the complexity,
wherein the pre-processing circuit is further configured to determine whether a scene change has occurred in the current frame, and generate scene change information according to a result of the determination; and
the complexity estimator is further configured to:
estimate the complexity of the processed current frame using an average quantization parameter of a previous frame and a number of bits generated when the previous frame is compressed, which are stored in the codec memory, when the scene change information indicates that the scene change has not occurred; and
estimate the complexity of the processed current frame using initial information stored in the codec memory based, when the scene change information indicates that the scene change has occurred.

10. The SoC of claim 9, wherein the ROI control signal generator comprises:
a classifier configured to classify the processed current frame into one of a plurality of categories according to the complexity, and output the ROI control signal and classification information related to the one of the plurality of categories; and
a calculator configured to receive the ROI control signal and the classification information, and perform, according to the ROI control signal, one of:
an operation of calculating the quantization parameter of each of the blocks included in the processed current frame while encoding each of the blocks; and
operations of adjusting a quantization parameter of one or more blocks according to the ROI information, and re-adjusting a quantization parameter of at least one of the one or more blocks using an adjustment value corresponding to the classification information.

11. The SoC of claim 10, wherein the classifier is further configured to generate the ROI control signal indicating the ROI coding is enabled, when the complexity is greater than or equal to a first threshold value, and generate the ROI control signal indicating the ROI coding is disabled, when the complexity is less than the first threshold value.

12. The SoC of claim 11, wherein the calculator is further configured to read the ROI information from the codec memory in response to the ROI control signal indicating the ROI coding is enabled, calculate the quantization parameter of a block of the current frame, adjust the quantization parameter according to the ROI information, and re-adjust the adjusted quantization parameter using the adjustment value corresponding to the classification information.

13. The SoC of claim 12, wherein the ROI information decreases the quantization parameter when the block corresponds to the ROI object, and increases or maintains the quantization parameter when the block does not correspond to the ROI object.

14. The SoC of claim 12, wherein the quantization parameter is re-adjusted when a difference between a quantization value of the block and a quantization value of a neighboring block is greater than the adjustment value.

15. The SoC of claim 11, wherein the calculator is further configured to calculate the quantization parameter in response to the ROI control signal indicating the ROI coding is disabled.

16. The SoC of claim 11, wherein the classifier is further configured to classify the current frame into a first group when the complexity less than the first threshold value, classify the current frame into a second group corresponding to a first adjustment value when the complexity is greater than or equal to a second threshold value, and classify the current frame into a third group corresponding to a second adjustment value when the complexity is greater than or equal to the firs threshold value and less than the second threshold value.

17. A method of coding of a region-of-interest (ROI) in a current frame in a codec device, the method comprising the steps of:
receiving, at a codec central processing unit (CPU), the current frame, which includes an ROI information generated in response to an ROI control signal;
determining, by the codec CPU, a type of the current frame;

receiving, at a complexity estimator, the type of the current frame;

estimate a complexity of the current frame at the complexity estimator of the codec;

receiving, at an ROI control signal generator of the codec, the complexity of the current frame;

generate, at the ROI control signal generator, the ROI control signal indicating whether the coding of the ROI information is enabled or disabled, based on the complexity, and adjusting, at the ROI control signal generator, a quantization parameter of each of a plurality of blocks included in the current frame based on the ROI information, in response to the ROI control signal indicating the ROI coding is enabled, wherein the complexity estimator is configured to estimate the complexity of the current frame using an average quantization parameter of a previous frame and a number of bits generated when the previous frame is compressed, which are stored in a codec memory, when received scene change information indicates that a scene change has not occurred; and wherein the complexity estimator is further configured to estimate the complexity of the current frame using initial information stored in the codec memory, when the received scene change information indicates that the scene change has occurred.

* * * * *